United States Patent [19]

Seo

[11] Patent Number: 5,724,704
[45] Date of Patent: Mar. 10, 1998

[54] DETACHABLE HINGE DEVICE FOR PORTABLE NOTEBOOK COMPUTER

[75] Inventor: Yong-Seok Seo, Kyonggi-do, Rep. of Korea

[73] Assignee: SamSung Electronics Co., Ltd., Suwon, Rep. of Korea

[21] Appl. No.: 616,555

[22] Filed: Mar. 18, 1996

[30] Foreign Application Priority Data

Apr. 6, 1995 [KR] Rep. of Korea ............... 6762/1995

[51] Int. Cl.⁶ ................................................ E05D 7/10
[52] U.S. Cl. .................... 16/254; 16/261; 16/271; 16/272; 361/680
[58] Field of Search ............... 16/254, 260–265, 16/251, 270–272, 382; 403/294, 316; 361/679–686, 724–727, 789, 796, 803

[56] References Cited

U.S. PATENT DOCUMENTS

| 4,729,134 | 3/1988 | Hillebrand et al. ............ 16/271 |
| 5,052,078 | 10/1991 | Hosoi . |
| 5,077,551 | 12/1991 | Saitou ........................ 16/297 |
| 5,109,572 | 5/1992 | Park . |
| 5,144,290 | 9/1992 | Honda et al. . |
| 5,168,426 | 12/1992 | Hoving et al. . |
| 5,168,429 | 12/1992 | Hosoi ........................ 361/680 |
| 5,178,481 | 1/1993 | Kawamura . |
| 5,195,213 | 3/1993 | Ohgami et al. . |
| 5,209,448 | 5/1993 | Hatanaka et al. . |
| 5,214,574 | 5/1993 | Chang . |
| 5,238,421 | 8/1993 | Kobayashi . |
| 5,253,139 | 10/1993 | Satou . |
| 5,379,182 | 1/1995 | Fujimori et al. . |
| 5,379,183 | 1/1995 | Okonsky et al. . |
| 5,390,075 | 2/1995 | English et al. . |
| 5,507,072 | 4/1996 | Youn ......................... 16/272 |

FOREIGN PATENT DOCUMENTS

1136003 12/1968 United Kingdom ............ 16/270

*Primary Examiner*—Chuck Y. Mah
*Attorney, Agent, or Firm*—Robert E. Bushnell, Esq.

[57] ABSTRACT

A hinge device for connecting a main body and a display unit of a portable computer includes a projection, a hinge member, and attachment units. The projection extends from a lower edge of the display unit, and the hinge member extends outwardly from both sides of the projection and connects to respective attachment units. A groove for receiving an end portion of hinge member is formed in each attachment unit. Each groove has a shape that is complementary to the shape of the end portion of the hinge member, so that the end portion of the hinge member easily inserts into the groove. In a preferred embodiment, one attachment unit is fixedly installed on the main body of the computer, and the other attachment unit is detachably connected to the main body. The attachment units and projection define a pivot axis about which the display unit rotates relative to the main body.

12 Claims, 4 Drawing Sheets

DETACHABLE HINGE DEVICE FOR PORTABLE NOTEBOOK COMPUTER

CROSS-REFERENCE TO RELATED APPLICATIONS

This application makes reference to, incorporates the same herein, and claims all benefits accruing under 35 U.S.C. §119 from an application for Detachable Hinge Device For Portable Notebook Computer earlier filed in the Korean Industrial Property Office on 6 Apr. 1995 and there assigned Ser. No. 6762/1995.

BACKGROUND OF THE INVENTION

The present invention relates to a hinge device for a portable notebook computer, and more particularly, to a hinge device for attaching and detaching a display unit to and from a main body of a portable notebook computer.

As computer technology has advanced, the use of portable notebook computers has become increasingly popular. A portable computer typically comprises a main body, and a display unit that rotates upwardly from the main body to provide the user with a viewing environment. One problem that often burdens the users of portable computers is eye fatigue resulting from prolonged viewing of the display unit at a constant position. To remedy this problem, it is desirable for the display unit to be detachable from the main body so that the user may position the display unit in a location that is less conducive to eye fatigue.

Typically, hinge devices for portable computers are designed to provide a connection between the main body and the display unit that can not be readily altered by a user. An example of such a hinge device is disclosed in U.S. Pat. No. 5,195,213. The present invention has been contemplated in an effort to provide a hinge device that overcomes the problem described above.

SUMMARY OF THE INVENTION

It is therefore an object of the present invention to provide an improved hinge device for a portable notebook computer.

It is another object to provide a hinge device for pivotally combining a main body and a display unit of a portable notebook computer.

It is still another object to provide a hinge device for attaching and detaching a display unit to and from a main body of a portable notebook computer.

It is yet another object to provide a hinge device for a portable notebook computer that enables a display unit to be connected to and disconnected from a main body of the computer by a user.

It is still yet another object to provide a hinge device for a portable notebook computer that reduces production costs of the computer.

These and other objects can be achieved according to the principles of the present invention with a hinge device for connecting a main body and a display unit of a portable computer. The hinge device comprises a projection, a hinge member, and attachment units. The projection extends from a lower edge of the display unit, and the hinge member extends outwardly from both sides of the projection and connects to respective attachment units. A groove for receiving an end portion of hinge member is formed in each attachment unit. Each groove has a shape that is complementary to the shape of the end portion of the hinge member, so that the end portion of the hinge member easily inserts into the groove. In a preferred embodiment, one attachment unit is fixedly installed on the main body of the computer, and the other attachment unit is detachably connected to the main body. The attachment units and projection define a pivot axis about which the display unit rotates relative to the main body.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF PREFERRED EMBODIMENTS

Figure 1:
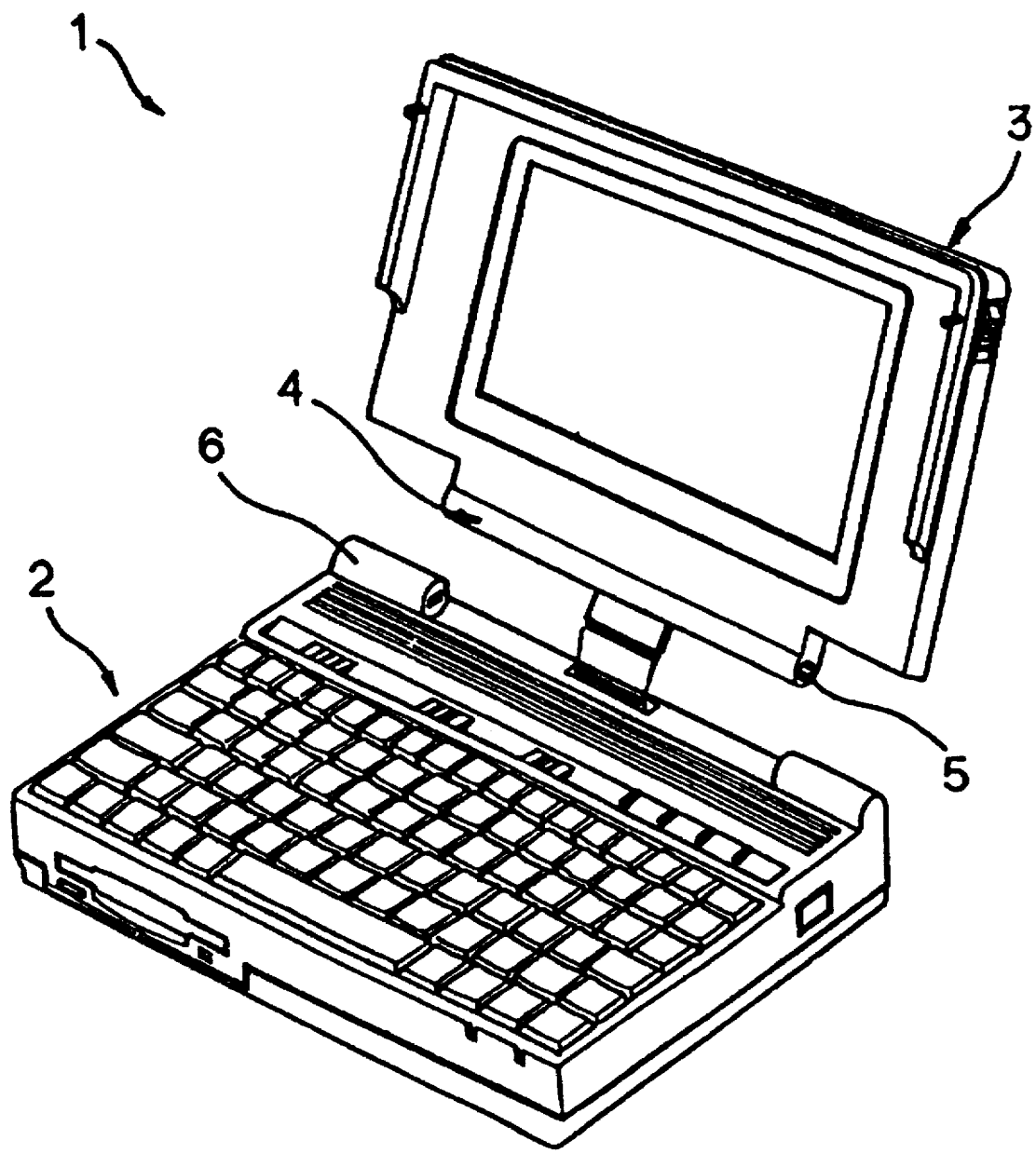
FIG. 1 is a perspective view showing a conventional notebook computer.

Turning now to the drawings and referring to FIG. 1, a conventional portable notebook computer 1 is shown. In FIG. 1, a main body 2 including a keyboard, and an LCD (liquid crystal display) display unit 3 are integrally connected. A projection 4 from display unit 3 and an attachment unit 6 of main body 2 are attached via a hinge member 5. With this construction, however, display unit 3 can not be easily removed from main body 2. Accordingly, users of portable notebook computer 1 may experience fatigue after viewing display unit 3 at a close up range for a long period of time since they can not easily move display unit 3 to a more accommodating location. As a result, the operating efficiency for such a computer is reduced.

Also, when producing notebook computer 1 on an assembly line, productivity is relatively low since a specialized tool is required to connect main body 2 and display unit 3.

The preferred embodiments of the present invention will now be explained below with reference to the accompanying drawings. Although the drawings illustrate preferred embodiments of the present invention, it is to be understood that the present invention is not necessarily limited to these particular embodiments.

Figure 2:
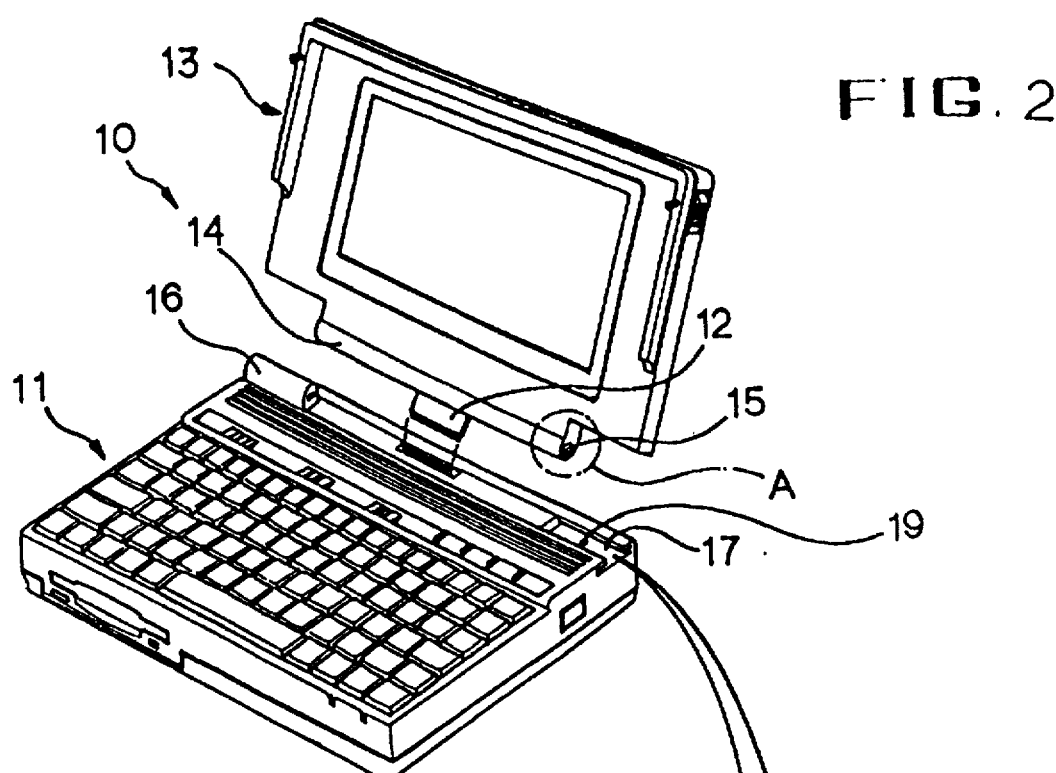
FIG. 2 is an exploded view showing a hinge device of a notebook computer in accordance with a preferred embodiment of the present invention.
Figure 2:
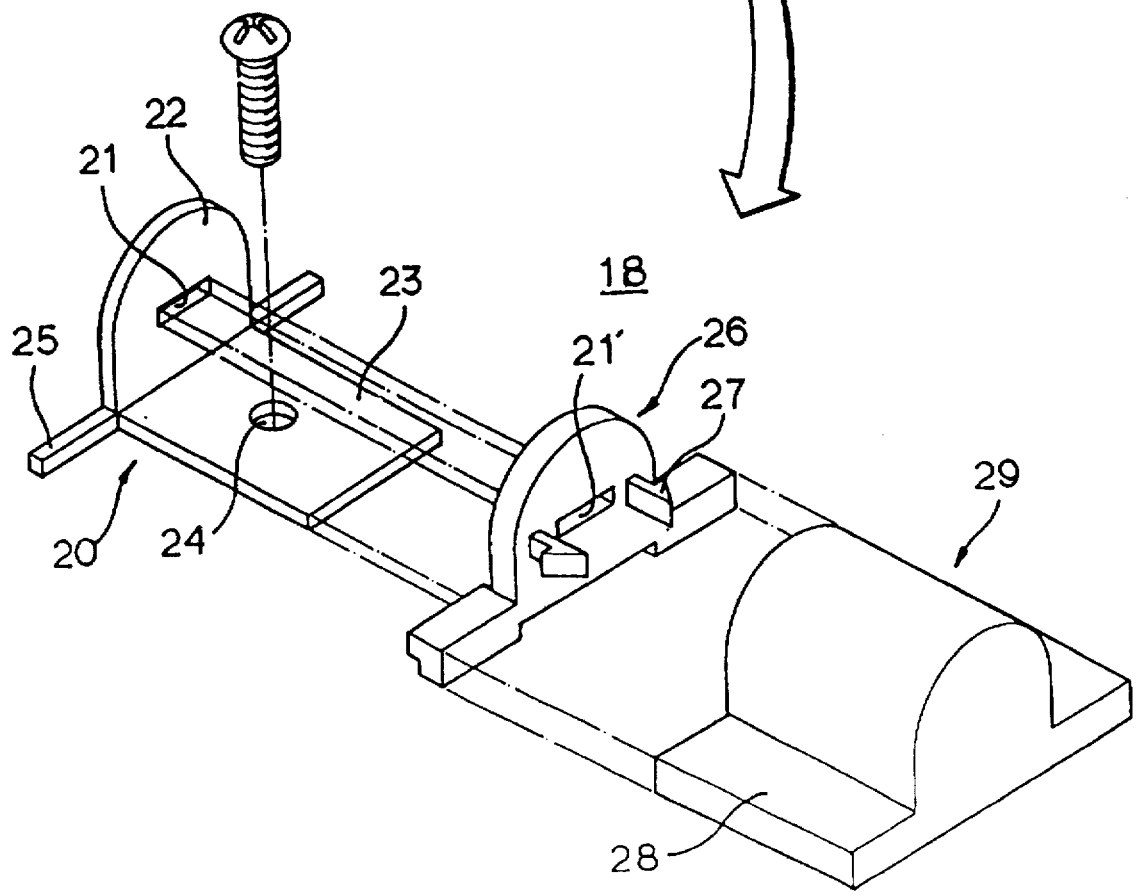

Referring to FIG. 2, a portable notebook computer 10 includes a main body 11 having a keyboard, and an LCD display unit 13 electrically connected to main body 11 via a data cable 12. Display unit 13 is pivotally attached to main body 11 via a hinge device.

The hinge device includes a projection 14, a hinge member 15, and attachment units 16 and 18. Projection 14 extends from a lower edge of display unit 13. Hinge member 15 extends outwardly from both sides of projection 14, and connects to respective attachment units 16 and 18.

Figure 3:
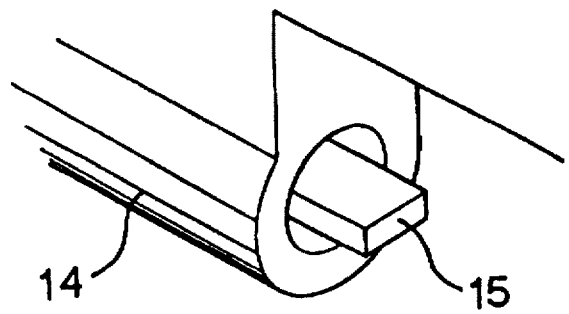
FIG. 3 is an enlarged view showing a portion "A" of FIG. 2.

As shown in FIG. 3, which shows an enlargement of a portion "A" of FIG. 2, hinge member 15 is largely contained within projection 14, and only end portions of hinge member 15 extend outwardly from sides of projection 14.

A groove 21 for receiving an end portion of hinge member 15 is formed in each attachment unit 16 and 18. Groove 21 has a shape that is complementary to the shape of the end portion of hinge member 15, so that the end portion of hinge member 15 easily inserts into groove 21. In the embodiment of FIG. 2, attachment unit 16 is integrally formed on main body 11, and the other attachment unit 18 is detachably connected to main body 11. It is, however, conceivable that both attachment units 16 and 18 be detachably connected to main body 11. Attachment units 16 and 18 and projection 14 define an axis about which display unit 13 rotates relative to main body 11.

Since attachment unit 16 is fixedly installed on main body 11, just as with a conventional notebook computer, only attachment unit 18, which is detachable from main body 11, will be explained hereinafter.

Attachment unit 18 is preferably constructed so as to be slidably mountable onto main body 11, as indicated by FIG. 2. This is enabled through a channel 17 formed in main body 11 having a C-shaped section and a threaded hole 19. A penetrating hole 24 is formed in attachment unit 18 at a position corresponding to threaded hole 19 on the bottom of channel 17 so that attachment unit 18 can be slidably inserted into channel 17 and connected to the bottom of channel 17 by a bolt.

In the embodiment shown in FIG. 2, attachment unit 18 is comprised of a bracket 20, an injection molding 26 and a cover 29. Bracket 20 includes: a vertical plate 22 having groove 21 into which an end portion of hinge member 15 is inserted, a horizontal plate 23 wherein penetrating hole 24 is formed extending perpendicularly from vertical plate 22, and a supporting rod 25 formed along an extended border line between vertical plate 22 and horizontal plate 23. Injection molding 26 includes: a groove 21' corresponding to groove 21 on vertical plate 22 of bracket 20, and a fastener 27 extending outwardly in a direction away from vertical plate 22. FIG. 2 shows bracket 20 and injection molding 26 as being separate components. In practice, however, bracket 20 and injection molding 26 are integrally formed. Cover 29 includes: a connecting portion (not shown) which connects to fastener 27 of injection molding 26, and a flange 28 for accommodating insertion of cover 29 into channel 17 on main body 11.

Figure 4:
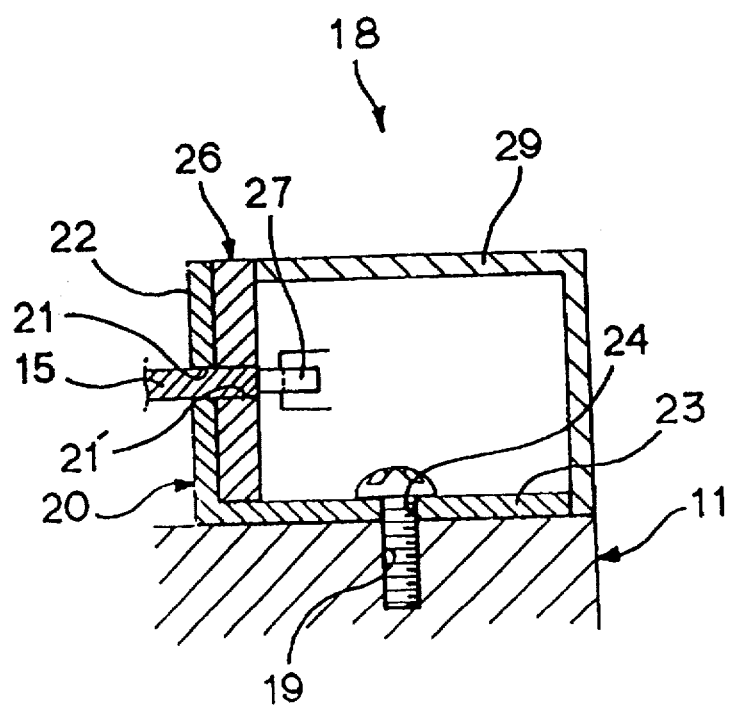
FIG. 4 is a cross-sectional side view showing the hinge device of FIG. 2 in an assembled state.

In assembling the hinge device constructed according to the embodiment shown in FIG. 2, after connecting the left end (not shown) of hinge member 15 to attachment unit 16, the right end of hinge member 15 is inserted into groove 21 of bracket 20 and groove 21' of injection molding 26 by inserting the assembled bracket 20 and injection molding 26 into channel 17. Next, bracket 20 is connected to the bottom of channel 17 by a bolt passing through penetrating hole 24 and threaded hole 19, and the connecting portion of cover 29 is connected to fastener 27 of injection molding 26 by inserting cover 29 into channel 17. The assembled state of attachment unit 18 is shown in the cross-sectional side view of FIG. 4.

Figure 5:
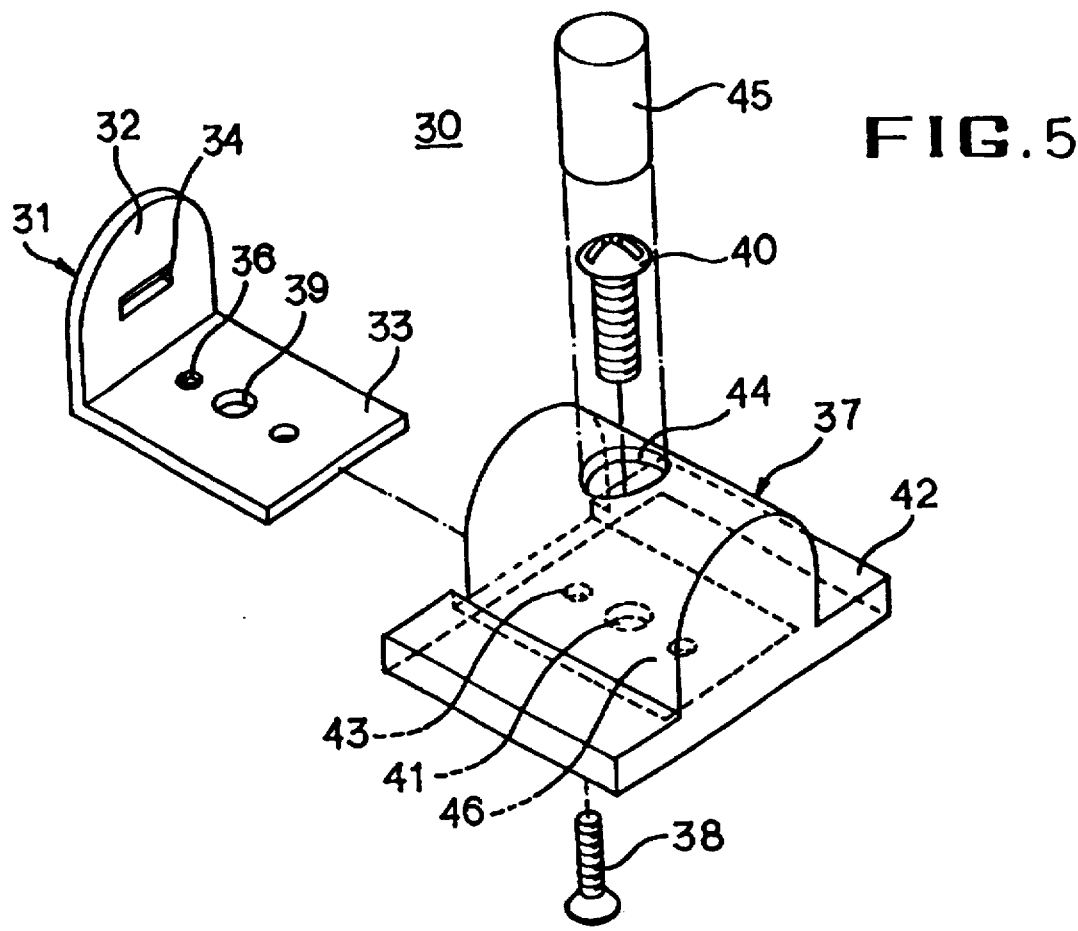
FIG. 5 is an exploded perspective view showing a hinge device in accordance with another preferred embodiment of the present invention.

In the embodiment shown in FIG. 5, an attachment unit 30 comprises a bracket 31 and a cover 37. Bracket 31 includes: a vertical plate 32 having a groove 34 into which an end portion of hinge member 15 is inserted, and a horizontal plate 33 wherein a penetrating hole 39 and a threaded hole 36 are formed extending perpendicularly from vertical plate 32. Cover 37 includes: a bottom plate 46 having a penetrating hole 41 and an engaging hole 43 respectively corresponding to penetrating hole 39 and threaded hole 36 of bracket 31, and a flange 42 formed integrally with bottom plate 46 for accommodating insertion within channel 17 of main body 11. A hole 44, through which a bolt 40 passes, is formed on cover 37 so that attachment unit 30 can be fixedly installed within channel 17 of main body 11. A plug 45 is provided to close hole 44 after bolt 40 is secured within threaded hole 19.

Figure 6:
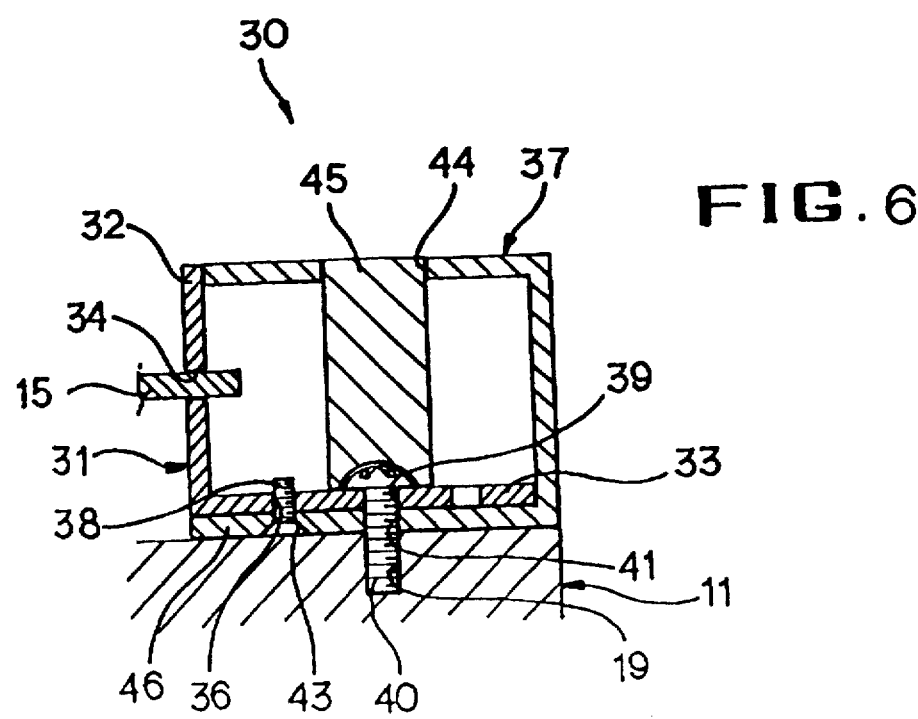
FIG. 6 is a cross-sectional side view showing the hinge device of FIG. 5 in an assembled state.

In assembling the hinge device constructed according to the embodiment shown in FIGS. 5 and 6, bracket 31 is first inserted into cover 37 and the two components are connected to each other via a bolt 38 passing through engaging hole 43 and threaded hole 36. Then, after connecting the left end (not shown) of hinge member 15 to attachment unit 16 in the manner indicated in FIG. 2, the right end of hinge member 15 is inserted into groove 34 of bracket 31 by inserting the assembled bracket 31 and cover 37 into channel 17 of main body 11. Next, the assembled bracket 31 and cover 37 is fixedly installed within channel 17 by bolt 40 passing through penetrating holes 39 and 41, and hole 44 is closed by the insertion of plug 45. The assembled state of attachment unit 30 is shown in the cross-sectional side view of FIG. 6.

Disassembling the hinge device can be carried out in the reverse order of the above described assembly steps.

As mentioned previously, the main body and display unit of a portable notebook computer can be easily attached and detached using the hinge device constructed according to the present invention. Consequently, since users of notebook computers can quickly and conveniently remove the display unit from the main body for placement of the display unit at a desired position, eye fatigue resulting from prolonged viewing of the display unit from a constant distance can be reduced, and user operating efficiency accordingly improves.

Moreover, when assembling the main body and the display unit of the computer, there is no need for a specialized tool. Therefore, the present invention provides the advantage of easy assembly during manufacturing when the computer is produced, and when a user simply wishes to replace the display unit.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A hinge device, comprising:
   a projection having first and second sides and extending from a lower edge of a first element;
   a hinge member having first and second ends extending outwardly from said first and second sides of said projection, respectively;
   a first attachment unit positioned on a second element and connecting to said first end of said hinge member; and
   a second attachment unit detachably mounted on said second element and having a first groove for receiving said second end of said hinge member, said projection and said first and second attachment units defining an axis about which said first element rotates relative to said second element, said second attachment unit comprising;
a bracket, comprising:
- a vertical plate having said first groove formed therein for receiving said second end of said hinge member;
- a horizontal plate extending perpendicularly from said vertical plate; and
- a supporting rod formed along an extended border line between said vertical plate and said horizontal plate;

an injection molding connected to said bracket, said injection molding having a second groove corresponding to said first groove formed in said vertical plate and a fastener extending outwardly in a direction away from said vertical plate; and a cover connected to said fastener of said injection molding, said cover having a flange for accommodating insertion of said cover into a channel formed in said second element.

2. The hinge device as claimed in claim 1, wherein said first attachment unit is integrally formed on said second element.

3. The hinge device as claimed in claim 1, wherein said first groove exhibits a first shape that is complementary to a second shape exhibited by said second end of said hinge member to accommodate insertion of said second end of said hinge member into said first groove.

4. The hinge device as claimed in claim 1, further comprised of said second element having a threaded hole formed in a bottom portion of said channel for receiving a connector that secures said second attachment unit within said channel.

5. The hinge device as claimed in claim 4, wherein said channel is C-shaped.

6. The hinge device as claimed in claim 4, wherein said first element comprises a display unit of a notebook computer.

7. The hinge device as claimed in claim 6, wherein said second element comprises a main body of the notebook computer.

8. A hinge device, comprising:
a projection having first and second sides and extending from a lower edge of a first element;
a hinge member having first and second ends extending outwardly from said first and second sides of said projection, respectively;
a first attachment unit integrally formed on a second element for connecting to said first end of said hinge member;
a second attachment unit detachably mounted on said second element and having a first groove for receiving said second end of said hinge member, said projection and said first and second attachment units defining an axis about which said first element rotates relative to said second element; and
a channel formed within said second element to accommodate insertion of said second attachment unit, said second attachment unit comprising:

a bracket, comprising:
- a vertical plate having said first groove formed therein for receiving said second end of said hinge member; and
- a horizontal plate extending perpendicularly from said vertical plate; and a cover having a bottom plate connected to said horizontal plate of said bracket, and a flange formed integrally with said bottom plate for accommodating insertion of said second attachment unit within said channel of said second element.

9. The hinge device as claimed in claim 8, wherein said first groove exhibits a first shape that is complementary to a second shape exhibited by said second end of said hinge member to accommodate insertion of said second end of said hinge member into said first groove.

10. The hinge device as claimed in claim 9, wherein said first element comprises a display unit of a notebook computer.

11. The hinge device as claimed in claim 10, wherein said second element comprises a main body of the notebook computer.

12. A notebook computer, comprising:
a main body;
a display unit rotatably connected to said main body;
a projection having first and second sides and extending from a lower edge of said display unit;
a hinge member having first and second ends extending outwardly from said first and second sides of said projection, respectively;
a first attachment unit positioned on said main body and connecting to said first end of said hinge member; and
a second attachment unit detachably mounted on said main body and having a first groove for receiving said second end of said hinge member, said projection and said first and second attachment units defining an axis about which said display unit rotates relative to said main body, said second attachment unit comprising:
a bracket, comprising:
- a vertical plate having said first groove formed therein for receiving said second end of said hinge member;
- a horizontal plate extending perpendicularly from said vertical plate; and
- a supporting rod formed along an extended border line between said vertical plate and said horizontal plate;

an injection molding connected to said bracket, said injection molding having a second groove corresponding to said first groove formed in said vertical plate and a fastener extending outwardly in a direction away from said vertical plate; and a cover connected to said fastener of said injection molding, said cover having a flange for accommodating insertion of said cover into a channel formed in said main body.

* * * * *